Figures 1, 2:
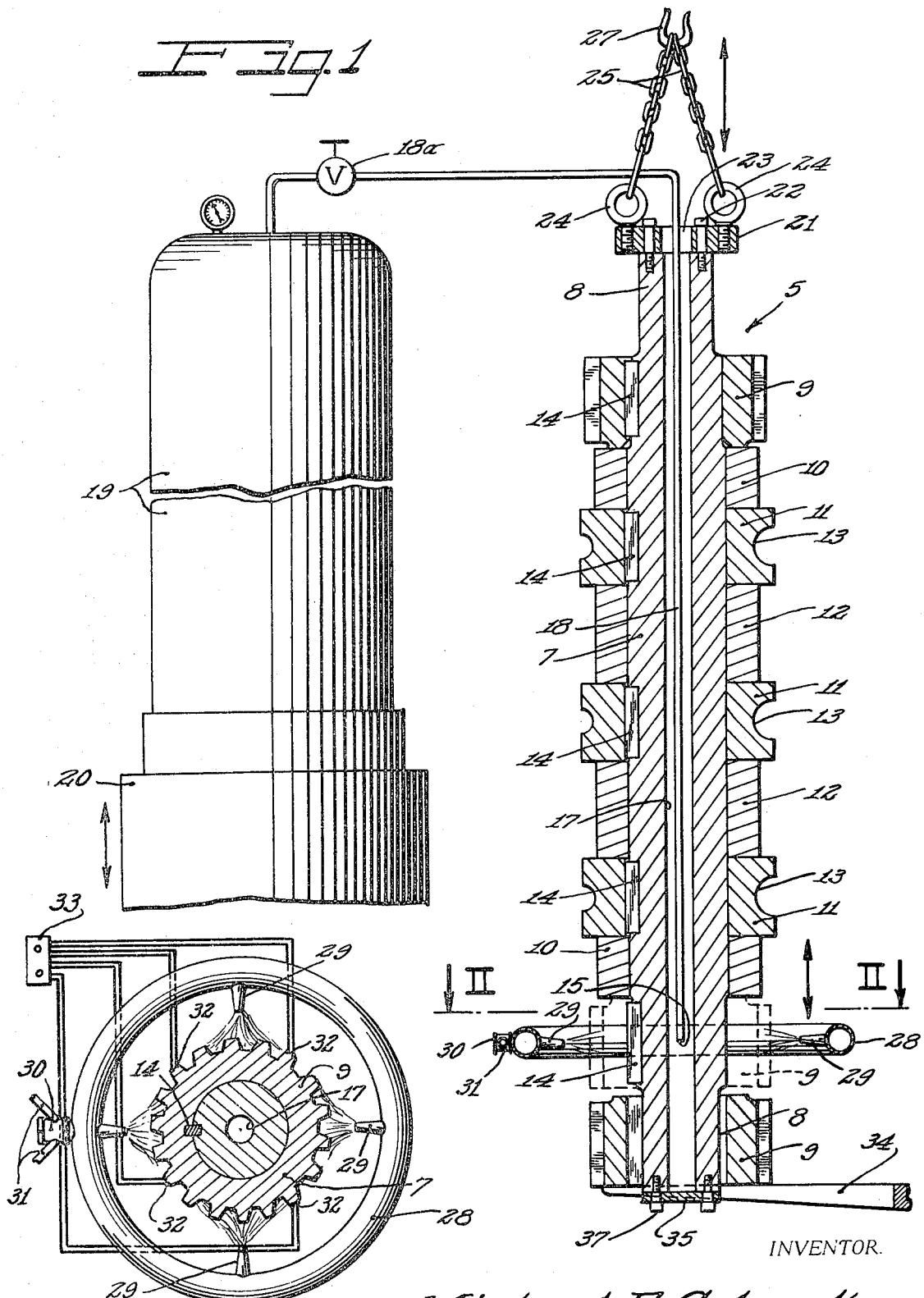

United States Patent [19]
Celovsky

[11] 3,724,059
[45] Apr. 3, 1973

[54] METHOD OF AND MEANS FOR SEPARATING INTERFERENCE-FITTED MEMBERS

[75] Inventor: Michael E. Celovsky, Bloomfield Hills, Mich.

[73] Assignee: Industrial Tool Engineering Company, Detroit, Mich.

[22] Filed: Jan. 15, 1970

[21] Appl. No.: 3,021

[52] U.S. Cl....................29/426, 29/200 D, 29/447
[51] Int. Cl. ...............................................B23p 19/00
[58] Field of Search.....29/447, 200 D, DIG. 35, 426, 29/427

[56] References Cited

UNITED STATES PATENTS

| | | |
|---|---|---|
| 1,955,728 | 4/1934 | Allen et al...............................29/447 |
| 1,980,156 | 11/1934 | Emrick...................................29/447 |
| 2,144,928 | 1/1939 | Moncrieff.................29/DIG. 35 UX |
| 2,267,339 | 12/1941 | Paulsen ..................................29/447 |
| 2,401,231 | 5/1946 | Crawford............................29/447 X |
| 2,839,143 | 6/1958 | Alexander..........................29/447 X |

Primary Examiner—Charlie T. Moon
Attorney—Hill, Sherman, Meroni, Gross & Simpson

[57] ABSTRACT

Members which have been secured in assembly by interference fit are separated by temperature differential shrinking the inner of the members and expanding the outer of the members. In a preferred manner, this is done by introducing a heat abstracting medium such as cold gas, i.e. nitrogen, to the interior of the inner member to cause it to shrink at least selectively in the area engaged by the outer member, and expanding the outer member by heating it, i.e., flame, induction, radiant.

41 Claims, 2 Drawing Figures

PATENTED APR 3 1973 3,724,059

INVENTOR.
Michael E. Cetovsky
BY Hill, Sherman, Meroni, Gross & Simpson
ATTORNEYS

METHOD OF AND MEANS FOR SEPARATING INTERFERENCE-FITTED MEMBERS

This invention relates to the method of and means for separating interference-fitted members, and is more particularly concerned with the reconditioning and salvaging of industrial apparatus such as heavy-duty tools.

A well known manner of effecting a rigid, non-loosening, fixed connection between metal members, such as annular tools mounted individually or in gang relation on a shaft is to shrink fit one member onto the other. That is, an annular member is heated, such as in a furnace, to expand it so that its normally smaller inner diameter will enlarge sufficiently to receive an inner member freely so that when the outer member cools and the inner diameter returns toward its normal dimension, it will grip the inner member in interference fit.

Separation of interference-fitted members has been accomplished in various ways, such as by introduction of hydraulic medium to the interference surfaces to expand the outer member and to lubricate the surfaces sufficiently to enable sliding the members apart. This requires a ready source of hydraulic pressure, and requires fitting the involved piece of equipment with high pressure connections and porting, often not available or feasible. Another manner of effecting separation is to grossly heat the outer member to the point where its expansion will be greater than the expansion of the inner member from the effects of the heating to enable removing one member from the other. With some assemblies this is impractical because the degree of heating required will impair the metallurgical characteristics of at least one, and generally the more important of the press-fitted members. A further manner of separation has been to apply sufficient differential axial pressure to force the members apart, but this usually results in at least one of the members being damaged to the extent that it may have to be scrapped. Still another manner of separating such members has been to bore off the inner of shaft member thereby destroying it, and subjecting the other member to the hazard of possible irreparable damage.

Where a plurality of tool members are mounted in interference fit on a common shaft, an especially costly situation has prevailed due to the difficulty in replacing any one or more of the tools that may become worn or damaged and which if replaced or repaired would significantly prolong the useful life of the device. It has often been necessary to stock replacements as entire assemblies at high tool cost in order to avoid extended machine shut-down time, and because of the great expense involved in reconditioning or salvaging the tools the entire assemblies have often been junked even though if an economical method of reconditioning or salvaging were available much additional useful life could be gained from the still usable tool members in the assembly.

According to the present invention, the foregoing and other disadvantages, shortcomings, inefficiencies and problems are overcome by providing a new and improved method of and means for separating interference or press-fitted members.

To this end, it is an object to separate the members by effecting temperature differential to shrink the inner member and expand the outer member and thereby enabling removal of one member from the other.

Another object of the invention is to provide a new and improved method of and means for separating interference fit members wherein one or more of a plurality of members mounted on a common shaft can be selectively removed from the shaft economically and rapidly and without disturbing the other members.

A further object of the invention is to provide a new and improved method of and means for separating interference fit members wherein the metallurgical characteristics of the members are preserved against deterioration and may even result in an improvement in such characteristics.

Yet another object of the invention is to provide a novel method of and means for separating interference fit members enabling economical reconditioning and salvaging of valuable tools.

It is still another object of the invention to provide a new and improved method of and means for separating interference-fitted members which will effect significant industrial economies.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

FIG. 1 is a partially schematic vertical sectional and elevational view illustrative of features of the invention; and FIG. 2 is a horizontal sectional view taken substantially along the line II—II of FIG. 1.

By way of example of an assembly including at least a pair of members which are in interference or press fit attachment to one another and in respect to which the new method and means of the present invention are especially useful, a tool unit 5 has been selected and which is of the type adapted to be employed in a so-called multistrand tube reducing machine. Such a tool unit comprises a shaft 7 of substantial length having respective opposite journal ends 8 of slightly reduced diameter adjacent to which are mounted respective gears 9 separated by spacer rings 10 from annular tools 11 which are in turn separated from one or more additional such annular tools 11 by respective spacer rings 12. At least the gears 9 and the tools 11, but generally also the spacers 10 and 12, are maintained in their selected place on the shaft 7 fixedly against at least axial displacement by interference or press fit wherein the annular members have normal inside diameters slightly smaller than the diameter of the selected area on the shaft on which mounted, and such annular members have been heated to expand the same to enlarge the inside diameters thereof temporarily sufficiently to effect relative axial movement of the same into position on the shaft and on cooling and shrinking onto the shaft maintaining the interference fit. Each of the tools 11 has an outer perimeter tube-shaping groove 13. In order to further assist in maintaining a corotational relationship of the shaft 7 and the gears and the tools in use against high torque stresses, each of these members is desirably keyed to the shaft as by means of a key 14.

Should either of the gears 9 or any one or more of the tools 11 become damaged or worn so that it may require replacement or reconditioning, it must be removed from the shaft 7 and replaced either after reconditioning or by a spare gear or tool in order to salvage the remainder of the tool unit 5 for use. According to the present invention, separation of any selected one or more of the annular members from the shaft 7 is adapted to be accomplished selectively and economically by effecting a temperature differential between the shaft member and the annular member, including abstracting heat from and shrinking the inner or shaft member relative to the outer or ring member, until they are loose from each other, and separating the thus loosened members. Cold gas applied to at least the selected area of the shaft to be shrunk is a desirable heat-abstracting medium. Liquid nitrogen as it expands is an economical commercially available source of gas useful for the purpose.

One desirable manner of applying the heat-abstracting gas to the selected area of the shaft comprises inserting a nozzle 15 into an axial bore 17 in the shaft 7 to issue the gas internally of the longitudinal area encompassed by the annular outer member to be removed from the shaft. A convenient arrangement comprises having the nozzle 15 at the end of, or comprising the end of a tube or pipe 18 which is of sufficiently smaller outside diameter than the diameter of the bore 17 to be received freely therein. The tube duct 18 should be of small enough inside diameter to be as economical as practicable in dispensing the gas, and it should be of a length to extend the nozzle 15 to any selected longitudinal area within the shaft. At its opposite end, the tube or gas transfer line 18 is connected to a gas supply or source which may conveniently be in the form of a supply tank 19 wherein the liquified gas is maintained under pressure and from which the gas is delivered to the line 18 through any suitable valve for the purpose, such as a control valve 18a.

Desirably the arrangement is such that the nozzle 15 can be readily inserted into and shifted longitudinally within the shaft bore 17. For this purpose, either or both of the shaft 7 and the nozzle 15 may be supported for relative movement. That is, the nozzle 15 may be supported to be moved longitudinally relative to the shaft 7, and the shaft 7 may be supported to be moved longitudinally relative to the nozzle 15. Although the nozzle supply duct or pipe 18 may be flexible and thereby movable longitudinally within the bore 17, the pipe is desirably of rigid tubing and carried by the tank 19 in such a manner that by moving the tank, the pipe 18 and thereby the nozzle 15 can be moved longitudinally within the bore 17. For this purpose, the tank 19 is mounted on a support 20 which may be provided with any desirable means for moving the tank through a range adequate for the purpose, in this instance vertically, as indicated by directional arrow where the shaft 7 is supported in a vertical position during member-separating activity.

Support of the shaft 7 in a vertical position is desirably effected by means of a hanger structure including a hanger plate 21 which may be secured removably to one end of the shaft as by means of screws 22 and which has an entry opening 23 aligned with the shaft bore 17 to enable entry of the nozzle pipe 18. Means such as suspension eyes 24 mounted on the plate 21 are adapted to be connected by means of chains 25 to a crane hook 27 by which the thus suspended shaft is adapted to be raised and lowered as indicated by directional arrows.

In order to expedite loosening of the selected annular member from the inner member or shaft 7, such selected annular member is desirably maintained at or brought to a temperature differential relative to the shrunken encompassed area of the shaft to facilitate loosening and removal of the members relative to one another. As the cold gas abstracts heat from and shrinks the selected area of the shaft, the encompassing annular member will also cool down and shrink concurrently unless the annular member is either maintained at room temperature or is heated to maintain it or bring it up to room temperature or a higher temperature. Actually if the annular member is heated to a higher temperature, so that it will expand, the separation is considerably expedited. To this end, means are provided for substantially uniformly heating the selected annular member. Although such heating may be effected by induction heating, radiant heating, or the like, an economical heating means comprises gas flame heating. For this purpose, a tubular flame ring 28 may be provided of a large enough diameter to encircle the selected annular member to be removed in ample spaced relation to enable flames from a set of inwardly projecting annularly spaced torches or nozzles 29 on the inner diameter of the ring to impinge and rapidly heat the selected annular member, shown in the drawings as comprising one of the gears 9. Gas may be supplied to the flame ring through a fixture 30 to which are connected supply ducts 31 which may be connected to an illuminating gas source and air, or oxygen and acetylene, or any other preferred combination of gases, depending on the intensity of flame desired. In order to accommodate the flame ring 28 with maximum efficiency for heating any one of the annular members along the length of the shaft, the ring is desirably mounted for selective axial movement, as indicated by directional arrows. In order to assure that the annular members on the shaft are not over-heated and thus metallurgically altered such as drawing their temper, means are desirably provided to monitor the heat. For this purpose, thermocouples 32 may be attached to at least the annular member which is to be removed and which is subjected to the heating flames. These thermocouples are connected with a control panel 33 for reading the temperture conditions of the member and, if desired, also providing control for the heating device.

In operation, the shaft 7 is suspended and the end portion thereof on which the one or more annular members to be removed is located extending downwardly. Then the nozzle 15 is located to impinge heat-abstracting gas onto the longitudinal area of the shaft encompassed by the lowermost of the annular members, which initially would be the gear 9. By preference the gas for shrinking the shaft is applied before the annular member is heated, as a conservation measure, and also unless some means are provided to monitor the temperature of the affected area of the shaft, initial refrigeration can be visually monitored by observing when frost appears externally of the shaft adjacent to the annular member to be removed. Then quick heating of the annular member will rapidly expand it sufficiently to come entirely loose from the shaft and drop downwardly onto suitable handling means such, for example, as a lift fork 34 of a lift fork truck by which the loosened member can then be lifted away from the lower end of the shaft and transported to any desired point. Although shrink cooling of the shaft and heating of the annular member to be removed may be effected in that order sequentially, if preferred they may be effected concurrently.

Assuming that one of the annular members other than the endmost member is the one actually desired to be replaced on the shaft, removal of the successive annular members after the endmost one will proceed successively until the annular member desired has been removed. Where such a succession of annular members is to be removed from the shaft, the lower end of the bore 17 is preferably closed by means of a plug or closure plate 35 which may be attached thereto by means of screws 37 to retain the heat-abstracting gas throughout the operation as a matter of economy. Should it be desired to remove all of the annular members from the shaft, after about half of them have been removed from one end of the shaft, the shaft may be turned end-for-end and the remaining annular members removed as a matter of convenience and to avoid need to effect undue vertical height adjustments of the various apparatus involved in the operation relative to one another.

From the foregoing it will be appreciated that the present invention provides a rapid and economical method and means for disassembling interference-fitted members, and more particularly tool units comprising a shaft carrying several tools. The shaft is always reusable. Only the one or more of the annular members requiring replacement need be changed on the shaft and the remaining members can remain in use on the shaft thus effecting substantial economy especially where relatively expensive tools are involved. Thus the economic cost of salvaging tools is substantially reduced as compared with prior methods. Because of the speed with which changes can be made in the tool assembly, significantly shorter downtime for the involved machine is accomplished, affording another advantageous cost saving by use of the present method. Instead of requiring an inventory of tool units, only individual tool members readily replaceable on the shaft need be inventoried, thus providing another important economic advantage where the present invention is employed.

In a typical example, having regard to multistrand tube reducing tool units such as the unit 5, shrinking temperatures of from about 0° to 100° below 0° Fahrenheit may be employed for shrinking the shaft. Where the tempering temperature of the tools 11 is about 300° to 400°, expansion heating thereof for removal from the shaft is controlled to be not in excess of 350° F. Even at that temperature it will be of sufficiently short duration to avoid any alteration in metallurgical characteristics in the annular member because just as quickly as the member expands sufficiently relative to the shrunken area of the shaft, the annular member will drop free for removal.

I claim as my invention:

1. A method of separating from an elongated hollow metal carrying member a selected one of a plurality of shorter annular metal members interference-fitted on the outer perimeter of the elongated member, comprising:

effecting chilling and shrinking said elongated member selectively in the area thereof encompassed by the endmost of said annular members whereby to effect loosening of the endmost member from the elongated member;

maintaining the interference fit of the remaining of said annular members; and separating the loosened endmost member from the elongated member.

2. A method according to claim 1, comprising supporting said elongated member vertically with said endmost member at the bottom, and receiving said separated endmost member on a transporting device.

3. A method according to claim 1, comprising inserting a nozzle into said elongated hollow member and issuing heat-abstracting gas to the selective area encompassed by the endmost annular member.

4. A method according to claim 3, including positioning about said endmost member a heating ring device, and heating said endmost member to increase the heat differential between the endmost member and said area of the elongated member to enhance separation of the members.

5. A method according to claim 1, including positioning about said endmost member a heating ring device, and heating said endmost member to increase the heat differential between the endmost member and said area of the elongated member to enhance separation of the members.

6. A method according to claim 1, including heating said endmost annular member to improve the separation of the members, and to avoid overheating said endmost annular member, applying thermo couple means thereto and reading the temperature conditions thereof to enable proper control of the heating.

7. A method according to claim 1, comprising successively removing additional of the annular members, including chilling and shrinking contiguously successive areas of the elongated member encompassed by successive ones of the annular members and removing the successive annular members while maintaining the remaining annular members in the interference-fitted relation to the elongated member.

8. A method according to claim 7, comprising effecting the chilling by issuing heat-abstracting gas from a nozzle inserted into said elongated member, and progressively moving said nozzle to apply the gas to the successive areas of the elongated member.

9. A method according to claim 7, comprising effecting the chilling by issuing heat-abstracting gas from a nozzle inserted into said elongated member, and moving said elongated member relative to said nozzle to align the nozzle with the successive areas of the elongated member.

10. A method according to claim 7, comprising effecting the chilling by issuing heat-abstracting gas from a nozzle inserted into said elongated member, and relatively moving said nozzle and said elongated member to effect alignment of the nozzle with the respective successive areas.

11. A method according to claim 1, wherein said elongated member comprises a heavy tool shaft and said annular members comprise heavy tools and spacers carried by said shaft, supporting said shaft vertically with said endmost annular member on the lowest portion of the shaft, and inserting into said elongated member through a bore therein opening through its upper end and extending through said area encompassed by the lower endmost annular member and positioning the nozzle in alignment with said lower endmost member encompassed area, and issuing chilling gas from said nozzle.

12. A method according to claim 11, comprising receiving the separated lower endmost annular member on a transporting device and removing the separated lower endmost member away from the shaft.

13. A method of separating a member carried in interference-fitted relation on the outer perimeter of a shaft, comprising:
supporting said shaft vertically;
effecting a temperature differential between the shaft and member, including abstracting heat from and shrinking the shaft relative to said member, until they are loose from each other;
separating said member by dropping it from the shaft; and
receiving the dropped member on a transporting device.

14. A method according to claim 13, wherein said shaft is hollow and has a bore extending therethrough from end to end, comprising applying a closure plate across the lower end of said bore, applying a supporting device to the upper end of said shaft leaving the upper end of said bore open and suspending said shaft with its lower end elevated in free hanging relation to facilitate reception of the separated outer member on and removal of the outer member from the shaft by said transporting device, and inserting through the open upper end of said bore means for introducing heat-abstracting gas into said bore for chilling and shrinking the shaft.

15. A method of separating from an elongated shaft having a longitudinal bore therein a plurality of outer members mounted in interference fit on the shaft in series relationship, comprising:
supporting said shaft vertically;
inserting a cold gas discharge nozzle into said bore;
supplying said nozzle with cold gas from a liquified gas supply;
relatively vertically moving said nozzle and said shaft to locate said nozzle in said bore at the area of the shaft on which the lowest in the series of said outer members is located on the shaft;
issuing cold gas from the nozzle to abstract heat from said area and thereby shrink said area; and
removing said lowest in the series of said outer members.

16. A method according to claim 15, including surrounding said lowest outer member by heating means thereabout, and applying heat from said heating means to said member to be removed to facilitate separating of the shaft and lowest member.

17. A method according to claim 16, comprising dropping the separated lowest member from the shaft.

18. A method according to claim 17, including receiving the dropped lowest member onto a transporting device.

19. A method according to claim 15, including surrounding said lowest member in the series by a flame ring, and applying heating flames from said flame ring onto said lowest member.

20. A method according to claim 16, including successively relatively moving said nozzle and said shaft to locate the nozzle at the next succeeding upper area of the shaft on which the next succeeding of said members is located, issuing cold gas from the nozzle to abstract heat from said next succeeding area, relatively moving said shaft and said heating means to surround said next succeeding member to be removed, applying heat from said heating means onto said next succeeding member, and removing said next succeeding member from the shaft.

21. A method according to claim 16, including applying sensing means to said member to be removed for determining the degree to which the member to be removed is heated by said heating means to facilitate controlling the heating.

22. Apparatus for separating from an elongated hollow metal carrying member a selected one of a plurality of shorter annular metal members interference-fitted on the outer perimeter of the elongated member, comprising:
means for effecting chilling and shrinking of said elongated member selectively in the area thereof encompassed by the endmost of said annular members whereby to effect loosening and separating of the endmost member from the elongated member while the interference fit of the remaining of the annular members is maintained; and
means for supporting the elongated member to enable separating of the loosened endmost member from the elongated member.

23. Apparatus according to claim 22, wherein said supporting means are adapted to support the elongated member vertically with said endmost member at the bottom, and a transporting device to receive the separated endmost member.

24. Apparatus according to claim 22, wherein said means for effecting chilling and shrinking comprise a nozzle adapted to be inserted into the elongated hollow member, and means supplying said nozzle with heat-abstracting gas to be issued to the selective area encompassed by the endmost annular member.

25. Apparatus according to claim 24, including a heating ring device adapted to be positioned about said endmost member for heating the endmost member to increase the heat differential between the endmost member and said area of the elongated member to enhance separation of the members.

26. Apparatus according to claim 22, including a heating ring device adapted to be positioned about said endmost member for heating the endmost member to increase the heat differential between the endmost member and said area of the elongated member to enhance separation of the members.

27. Apparatus according to claim 22, including means for heating said endmost annular member to improve separation thereof from said elongated member, and thermocouple means adapted to be applied to said endmost annular member enabling reading the temperature conditions thereof for proper control of the heating to avoid overheating the endmost annular member.

28. Apparatus according to claim 22, wherein said means for effecting chilling and shrinking is adapted to effect chilling and shrinking of contiguously successive areas of the elongated member encompassed by successive ones of the annular members for removal of the successive annular members, while maintaining the remaining annular members in the interference-fitted relation to the elongated member.

29. Apparatus according to claim 28, comprising issuing heat-abstracting gas from a nozzle comprising said means for effecting chilling and shrinking inserted into said elongated member, and means for progressively moving said nozzle to apply the gas to the successive areas of the elongated member.

30. Apparatus according to claim 28, wherein said means for effecting chilling and shrinking comprise a nozzle inserted into said elongated member and means for issuing heat-abstracting gas from said nozzle, and said supporting means are adapted to move said nozzle to align the nozzle with the successive areas of the elongated member.

31. Apparatus according to claim 28, wherein said means for effecting chilling and shrinking comprise a nozzle inserted into said elongated member and means for issuing heat-abstracting gas from said nozzle, and said nozzle and said elongated member being relatively movable to effect alignment of the nozzle with the respective successive areas.

32. Apparatus according to claim 22, wherein said elongated member comprises a heavy tool shaft and said annular members comprise heavy tools and spacers carried by said shaft, said supporting means supporting the shaft vertically with the endmost annular member on the lowest portion of the shaft, said elongated member having a bore therein opening through its upper end and extending through said area encompassed by the lower endmost annular member, and said means for effecting chilling and shrinking comprising a nozzle positioned in alignment with the area encompassed by the lower endmost member, and means for issuing chilled gas from said nozzle.

33. Apparatus according to claim 32, including a transporting device adapted to receive the separated lower endmost member for removing the same away from the shaft.

34. Apparatus for separating a member carried in interference-fitted relation on the outer perimeter of a shaft, comprising:
   means for supporting said shaft vertically;
   means for effecting temperature differential between the shaft and member by abstracting heat from and shrinking the shaft relative to the member until they are loose from each other and the separated member drops from the shaft; and
   a transporting device for receiving the dropped member.

35. Apparatus according to claim 34, wherein said shaft is hollow and has a bore extending therethrough from end-to-end, comprising a closure plate applied across the lower end of said bore, means for securing the supporting means to the upper end of said shaft leaving the upper end of said bore open and suspending the shaft with its lower end elevated in free hanging relation to facilitate reception of the separated outer member on and removal of the outer member from the shaft by said transporting device, and said means for effecting a temperature differential being inserted through the open upper end of the bore and being adapted for introducing heat-abstracting gas into the bore for chilling and shrinking the shaft.

36. Apparatus for separating from an elongated shaft having a longitudinal bore therein a plurality of outer members mounted in interference-fit on the shaft in series relationship, comprising:
   means for supporting the shaft vertically;
   a cold gas discharge nozzle being arranged to be inserted into said bore;
   means for supplying said nozzle with cold gas from a liquified gas supply;
   said nozzle and said supporting means being related to enable relative vertically moving the nozzle and shaft to locate the nozzle in the bore at the area of the shaft on which the lowest in the series of said outer members is located on the shaft; and
   said nozzle being operable to issue cold gas to abstract heat from said area and thereby shrink said area for loosening and separating the lowest member by removing it downwardly from the shaft.

37. Apparatus according to claim 36, including heating means for surrounding said lowest outer member and being adapted to apply heat to said member to be removed to facilitate separating of the shaft and lowest member to be removed.

38. Apparatus according to claim 37, wherein said separated lowest member is adapted to drop from the shaft, and a transporting device to receive the dropped lowest member.

39. Apparatus according to claim 36, including a flame ring to surround said lowest member in the series and adapted to apply heating flames onto said lowest member.

40. Apparatus according to claim 37, including means for successively relatively moving said nozzle and said shaft to locate the nozzle at the next succeeding upper area of the shaft on which the next succeeding of said members is located, said nozzle being adapted to issue cold gas to abstract heat from said next succeeding area, said shaft and said heating means being adapted for relative movement to effect surrounding of the next succeeding member to be removed by said heating means for application of heat from said heating means onto said next succeeding member.

41. Apparatus according to claim 37, including sensing means to be applied to the member to be removed for determining the degree to which the member to be removed is heated by said heating means to facilitate controlling the heating.

* * * * *